(12) United States Patent
Ahn

(10) Patent No.: US 9,046,944 B2
(45) Date of Patent: Jun. 2, 2015

(54) TOUCH SCREEN PANEL AND DRIVING METHOD THEREOF

(71) Applicant: SAMSUNG DISPLAY CO., LTD., Yongin-si, Gyeonggi-do (KR)

(72) Inventor: Soon-Sung Ahn, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 158 days.

(21) Appl. No.: 13/714,335

(22) Filed: Dec. 13, 2012

(65) Prior Publication Data

US 2014/0022188 A1    Jan. 23, 2014

(30) Foreign Application Priority Data

Jul. 17, 2012   (KR) .................. 10-2012-0077783

(51) Int. Cl.
| | |
|---|---|
| G09G 5/00 | (2006.01) |
| G06F 3/033 | (2013.01) |
| G09G 5/08 | (2006.01) |
| G06F 3/041 | (2006.01) |
| G06F 3/045 | (2006.01) |
| G06F 3/042 | (2006.01) |
| G06F 3/043 | (2006.01) |
| G06F 3/047 | (2006.01) |
| G06F 3/044 | (2006.01) |

(52) U.S. Cl.
CPC ............... *G06F 3/041* (2013.01); *G06F 3/047* (2013.01); *G06F 3/0416* (2013.01); *G06F 3/044* (2013.01); *G06F 2203/04112* (2013.01)

(58) Field of Classification Search
CPC ................................. G06F 3/041; G06F 3/047

USPC .................................. 345/156, 157, 173–178
See application file for complete search history.

(56) References Cited

U.S. PATENT DOCUMENTS

| | | | |
|---|---|---|---|
| 5,565,658 A * | 10/1996 | Gerpheide et al. ......... 178/18.02 |
| 2008/0157893 A1 | 7/2008 | Krah | |
| 2010/0097078 A1 | 4/2010 | Philipp et al. | |

(Continued)

FOREIGN PATENT DOCUMENTS

| | | |
|---|---|---|
| EP | 2363788 A2 | 9/2011 |
| KR | 10-0202699 | 6/1999 |

(Continued)

OTHER PUBLICATIONS

Extended European Search Report issued in EP 13152776.4, dated Oct. 9, 2014, 7 pages.

*Primary Examiner* — Ilana Spar
(74) *Attorney, Agent, or Firm* — Christie, Parker & Hale, LLP

(57) ABSTRACT

A touch screen panel includes a plurality of driving electrodes, a plurality of sensing electrodes crossing the driving electrodes, a driver for supplying a driving signal to the driving electrodes in a touch recognizing mode, and a controller for receiving signals from the sensing electrodes. In a noise measuring mode, the controller is configured to cut off an electrical connection between one of the driving electrodes and the driver or between one of the sensing electrodes and the controller, maintain an electrical connection between another one of the sensing electrodes and the controller, and detect a noise signal from the other one of the sensing electrodes. The touch screen panel and a driving method of the touch screen panel can increase or maximize the reception sensitivity of outside noise.

11 Claims, 9 Drawing Sheets

(56) References Cited

U.S. PATENT DOCUMENTS

| | | |
|---|---|---|
| 2011/0216033 A1 | 9/2011 | Mamba et al. |
| 2012/0043977 A1* | 2/2012 | Kremin et al. ............... 324/686 |
| 2013/0015868 A1* | 1/2013 | Peng ............................ 324/688 |

FOREIGN PATENT DOCUMENTS

| | | |
|---|---|---|
| KR | 10-1013514 | 2/2011 |
| KR | 10-2011-0061798 | 6/2011 |

\* cited by examiner

TOUCH SCREEN PANEL AND DRIVING METHOD THEREOF

CROSS-REFERENCE TO RELATED APPLICATION

This application claims priority to and the benefit of Korean Patent Application No. 10-2012-0077783, filed on Jul. 17, 2012 in the Korean Intellectual Property Office, the entire content of which is incorporated herein by reference.

BACKGROUND

1. Field

Aspects of embodiments of the present invention relate to a touch screen panel and a driving method of the touch screen panel.

2. Description of the Related Art

A touch screen panel is an input device that, for example, allows a user's instruction to be inputted by selecting an instruction content displayed on a screen of an image display or the like with a user's hand or object. For instance, the touch screen panel may be formed on a front face of the image display to convert a contact position into an electrical signal. The user's hand or object can then be directly in contact with the touch screen panel at the contact position. Accordingly, the instruction content selected at the contact position is inputted as an input signal to the image display. Since such a touch screen panel can be substituted for a separate input device connected to an image display, such as a keyboard or mouse, its applications have been gradually growing.

Touch screen panels can be divided into different types, such as a resistive overlay touch screen panel, a photosensitive touch screen panel, a capacitive touch screen panel, or the like. Among these touch screen panels, the capacitive touch screen panel, which has recently been widely used, detects a point at which capacitance is changed as a user's hand or object comes in contact with the touch screen panel, thereby sensing a contact position.

The performance of the capacitive touch screen panel may be lowered by outside noise, that is, spurious external signals that are sensed by the capacitive touch screen panel, thus degrading the touch screen panel's ability to sense intended touches from a user's hand or object. Accordingly, it sometimes may be necessary to drive the touch screen panel by avoiding the frequency of the outside noise. To accomplish this, the outside noise should be detected as precisely as possible, but the reception sensitivity of the outside noise may be too low for such precision.

SUMMARY

Embodiments of the present invention provide for a touch screen panel and a driving method of the touch screen panel. Further embodiments provide for a touch screen panel and corresponding driving method that can increase or maximize the reception sensitivity of outside noise.

According to an exemplary embodiment of the present invention, a touch screen panel is provided. The touch screen panel includes a plurality of driving electrodes, a plurality of sensing electrodes crossing the driving electrodes, a driver for supplying a driving signal to the driving electrodes in a touch recognizing mode, and a controller for receiving signals from the sensing electrodes. In a noise measuring mode, the controller is configured to cut off an electrical connection between one of the driving electrodes and the driver or between one of the sensing electrodes and the controller, maintain an electrical connection between another one of the sensing electrodes and the controller, and detect a noise signal from the other one of the sensing electrodes.

The touch screen panel may further include first switches between the driving electrodes and the driver.

In the noise measuring mode, the controller may be further configured to turn off one of the first switches.

In the touch recognizing mode, the controller may be configured to turn on the first switches.

The touch screen panel may further include second switches between the sensing electrodes and the controller.

In the noise measuring mode, the controller may be further configured to turn off one of the second switches.

In the touch recognizing mode, the controller may be configured to turn on the second switches.

The touch screen panel may further include first switches between respective ones of the driving electrodes and the driver, and second switches between respective ones of the sensing electrodes and the controller.

In the noise measuring mode, the controller may be further configured to turn off one of the first switches, and turn off one of the second switches.

In the touch recognizing mode, the controller may be configured to turn on the first and second switches.

The touch screen panel may further include a common line, third switches between the common line and respective common nodes between the respective ones of the driving electrodes and the first switches, and fourth switches between the common line and respective common nodes between the respective ones of the sensing electrodes and the second switches.

In the noise measuring mode, the controller may be further configured to turn on the third and fourth switches.

In the noise measuring mode, the controller may be further configured to turn off the first switches, and turn off all but one of the second switches.

In the touch recognizing mode, the controller may be configured to turn on the first and second switches, and turn off the third and fourth switches.

In the noise measuring mode, the controller may be further configured to electrically connect the driving and sensing electrodes to each other.

According to another exemplary embodiment of the present invention, a driving method of a touch screen panel is provided. The method includes: cutting off an electrical connection between one of a plurality of driving electrodes and a driver or between one of a plurality of sensing electrodes and a controller, when the touch screen panel is in a noise measuring mode; maintaining an electrical connection between another one of the sensing electrodes and the controller during the noise measuring mode; and detecting a noise signal output from the other one of the sensing electrodes during the noise measuring mode.

The touch screen panel may include first switches between respective ones of the driving electrodes and the driver.

The cutting off of the electrical connection may include turning off one of the first switches.

The method may further include turning on the first switches when the touch screen panel is in a touch recognizing mode after the noise measuring mode.

The method may further include supplying a driving signal from the driver to the driving electrodes during the touch recognizing mode.

The touch screen panel may include second switches between respective ones of the sensing electrodes and the controller.

The cutting off of the electrical connection may include turning off one of the second switches.

The method may further include turning on the second switches when the touch screen panel is in a touch recognizing mode after the noise measuring mode.

The method may further include supplying a driving signal from the driver to the driving electrodes during the touch recognizing mode.

The touch screen panel may include first switches between respective ones of the driving electrodes and the driver, and second switches between respective ones of the sensing electrodes and the controller.

The cutting off of the electrical connection may include turning off one of the first switches, and turning off one of the second switches.

The method may further include turning on the first and second switches when the touch screen panel is in a touch recognizing mode after the noise measuring mode.

The method may further include supplying a driving signal from the driver to the driving electrodes during the touch recognizing mode.

The touch screen panel may further include third switches between a common line and respective common nodes between the respective ones of the driving electrodes and the first switches, and fourth switches between the common line and respective common nodes between the respective ones of the sensing electrodes and the second switches.

The method may further include turning on the third and fourth switches during the noise measuring mode.

The cutting off of the electrical connection may further include turning off the first switches, and turning off all but one of the second switches.

The method may further include turning on the first and second switches and turning off the third and fourth switches when the touch screen panel is in a touch recognizing mode after the noise measuring mode.

The method may further include electrically connecting the driving and sensing electrodes to each other during the noise measuring mode.

According to the above and other embodiments of the present invention, it is possible to provide a touch screen panel and a driving method for the touch screen panel that can increase or maximize the reception sensitivity of outside noise.

BRIEF DESCRIPTION OF THE DRAWINGS

The accompanying drawings, together with the specification, illustrate exemplary embodiments of the present invention. These drawings, together with the description, serve to better explain aspects and principles of the present invention.

DETAILED DESCRIPTION

Figure 1A:
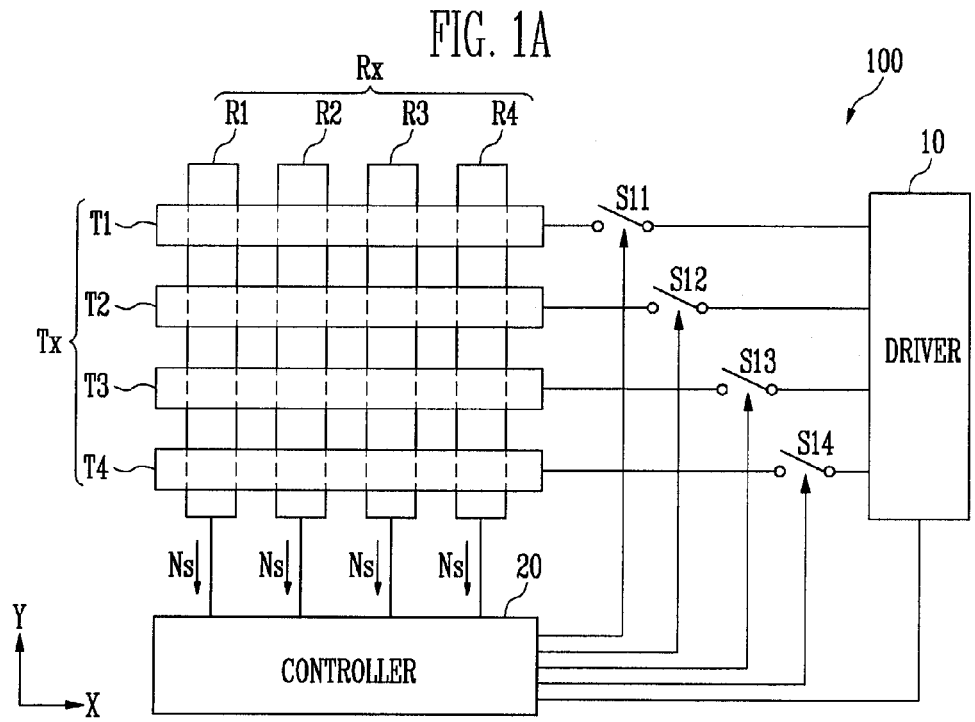
FIGS. 1A and 1B are diagrams showing a touch screen panel according to a first embodiment of the present invention.

In the following detailed description, certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Further, when an element is referred to as being "connected to" another element, it can be directly connected to the other element or be indirectly connected to the other element with one or more intervening elements interposed therebetween. Finally, like reference numerals refer to like elements throughout.

Hereinafter, touch screen panels and driving methods of the touch screen panels according to exemplary embodiments of the present invention will be described with reference to the accompanying drawings.

Figure 1B:
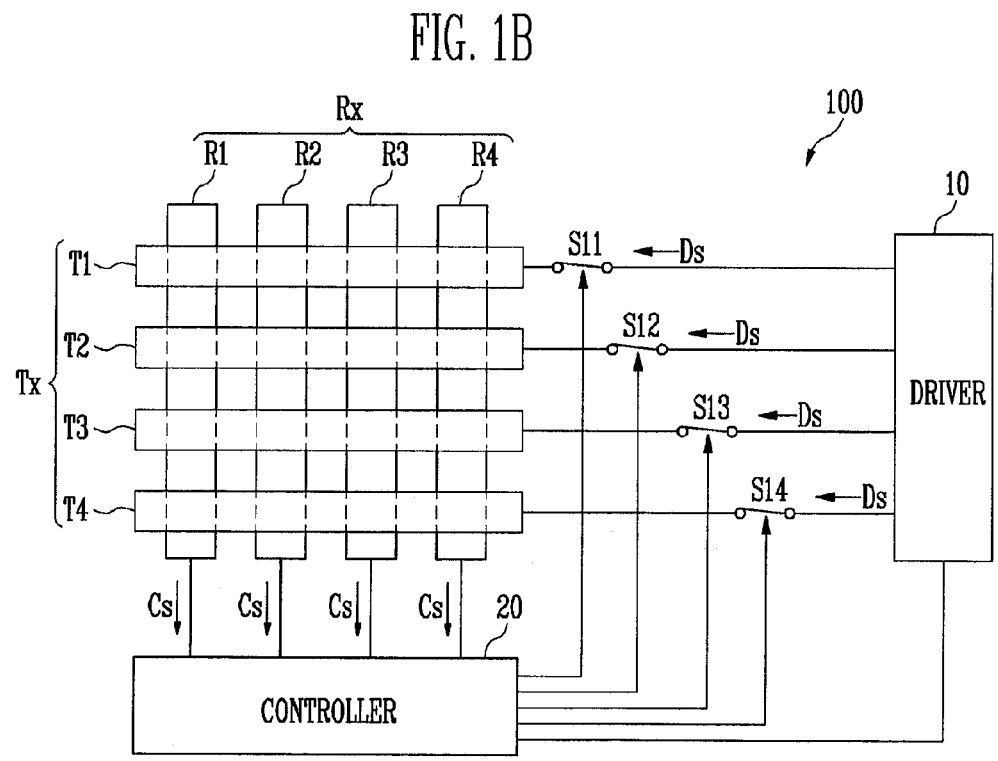

FIGS. 1A and 1B are diagrams showing a touch screen panel 100 according to a first embodiment of the present invention. In particular, FIG. 1A illustrates the touch screen panel 100 in a noise measuring mode, and FIG. 1B illustrates the touch screen panel 100 in a touch recognizing mode.

Referring to FIGS. 1A and 1B, the touch screen panel 100 includes driving electrodes Tx, sensing electrodes Rx, a driver 10, and a controller 20. The driving electrodes Tx are formed along a first direction (e.g., an X-axis direction). In other embodiments, a plurality of driving electrodes may instead or in addition be arranged along a second direction (e.g., a Y-axis direction) that crosses the first direction. Four driving electrodes T1, T2, T3, and T4 have been illustrated in FIGS. 1A and 1B, but the number of driving electrodes may be different in other embodiments.

The sensing electrodes Rx are arranged to cross the driving electrodes Tx. In the touch screen panel 100, the sensing electrodes Rx are formed along the second direction. In other embodiments, a plurality of sensing electrodes may instead or in addition be arranged along the first direction. Four sensing electrodes R1, R2, R3, and R4 have been illustrated in FIGS. 1A and 1B, but the number of sensing electrodes may be different in other embodiments.

The driving and sensing electrodes Tx and Rx may be formed of a transparent conductive material. For example, the driving and sensing electrodes Tx and Rx may be formed of indium tin oxide (ITO), indium zinc oxide (IZO), graphene, carbon nanotube, silver nanowires (AgNWs), or the like. The driving and sensing electrodes Tx and Rx are formed in a bar shape as shown in FIG. 1A. However, the shape of the driving and sensing electrodes Tx and Rx may be different in other embodiments.

The driving and sensing electrodes Tx and Rx may be disposed on a substrate, such as a predetermined substrate.

The substrate may be made of, for example, a material having insulation properties, such as glass, plastic, silicon, or synthetic resin. In addition, the substrate may be formed of metal or the like. The substrate may be implemented as a film having flexibility, which can be bent or folded.

The driving and sensing electrodes Tx and Rx may be disposed in different layers from each other. To this end, an insulation layer may exist between the driving and sensing electrodes Tx and Rx. The insulation layer may partially exist only in a region in which the driving and sensing electrodes Tx and Rx cross each other.

In the touch recognizing mode of FIG. 1B, the driver 10 supplies a driving signal Ds to the driving electrodes Tx. For example, the driver 10 may sequentially supply the driving signal Ds to the driving electrodes Tx. The touch recognizing mode is a mode in which a user's touch input to the touch screen panel 100 is detected.

In the touch screen panel 100, the driver 10 is controlled by the controller 20. For example, the driver 10 may set the frequency of the driving signal Ds to avoid the frequency of a noise signal Ns detected by the controller 20. The controller 20 receives signals (for example, a touch signal Cs and the noise signal Ns) output from the sensing electrodes Rx. Accordingly, the controller 20 can detect a user's touch input in the touch recognizing mode, and can detect outside noise in the noise measuring mode.

The noise measuring mode is a mode in which an outside noise signal (e.g., from an external environment) is detected. For example, the outside noise signal may be detected when there is no user's touch being input to the touch screen panel 100. The noise measuring mode may be performed, for example, when the touch screen panel 100 is initially driven, and may again be performed during the operation of the touch screen panel 100. For example, the noise measuring mode may be periodically performed to rapidly cope with a change in external environment.

In the noise measuring mode of the touch screen panel 100, the controller 20 cuts off the electrical connection between at least one driving electrode Tx and the driver 10 to improve the reception sensitivity of external noise. To this end, the touch screen panel 100 further includes first switches S11, S12, S13, and S14 positioned between the respective driving electrodes Tx and the driver 10. The on/off operations of the first switches S11, S12, S13, and S14 are controlled by the controller 20. Thus, the controller 20 turns off at least one of the first switches S11, S12, S13, and S14 to cut off the electrical connection between a corresponding at least one driving electrode Tx and the driver 10.

The controller 20 may detect the noise signal Ns output from the sensing electrodes Rx according to a change in capacitance caused by the outside noise. The first switches S11, S12, S13, and S14 are turned off to increase the reception sensitivity of this noise. Although four first switches S11, S12, S13, and S14 are illustrated in FIGS. 1A and 1B, the number of first switches may be different in other embodiments depending on factors such as the number of driving electrodes Tx.

Figure 1C:
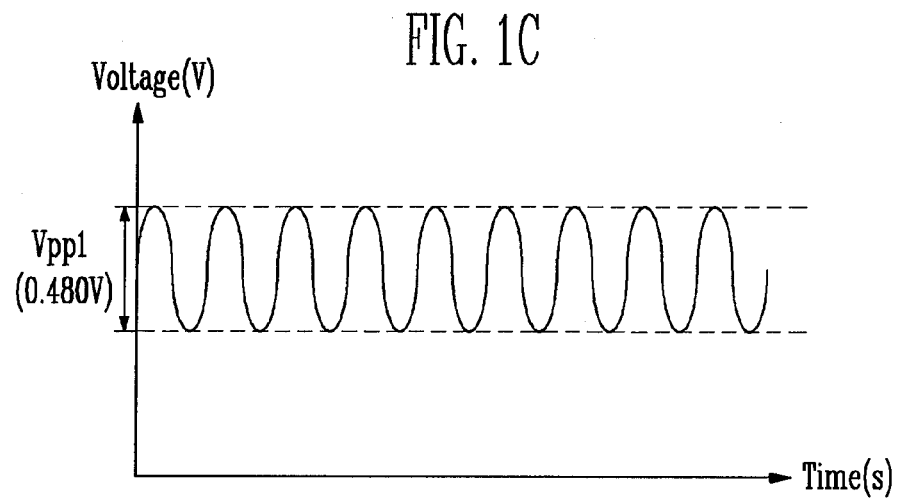
FIG. 1C is a waveform diagram showing a noise signal measured by the touch screen panel shown in FIG. 1A.

FIG. 1C is a waveform diagram showing the noise signal Ns measured by the touch screen panel shown in FIG. 1A. Here, the noise signal Ns is measured when the first switches S11, S12, S13, and S14 are turned off.

Figure 5A:
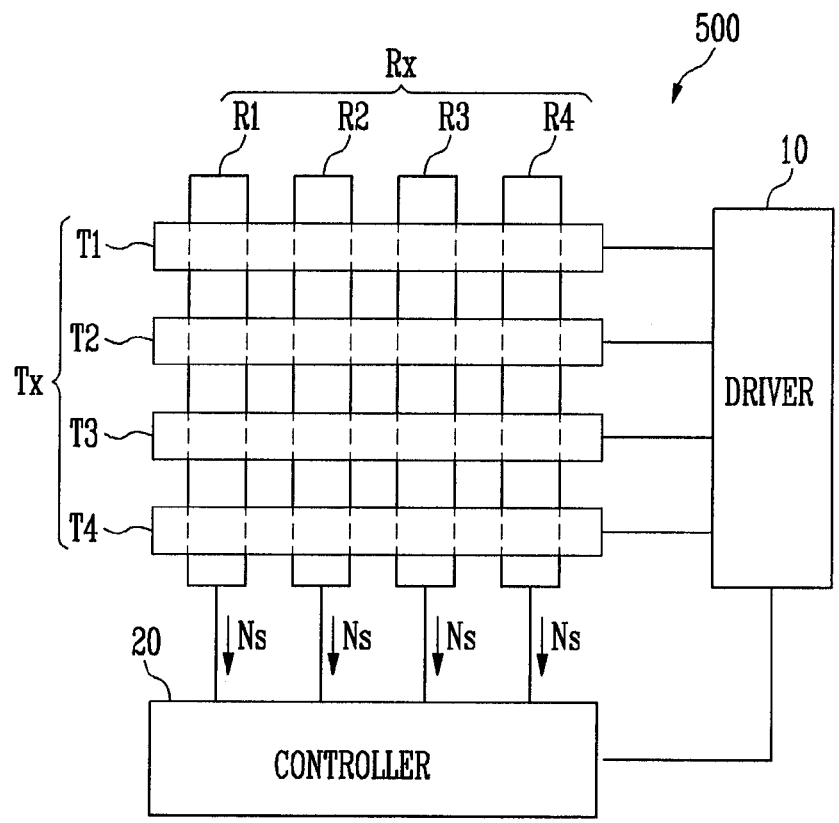
FIG. 5A is a diagram showing a comparable touch screen panel in a noise measuring mode.
Figure 5B:
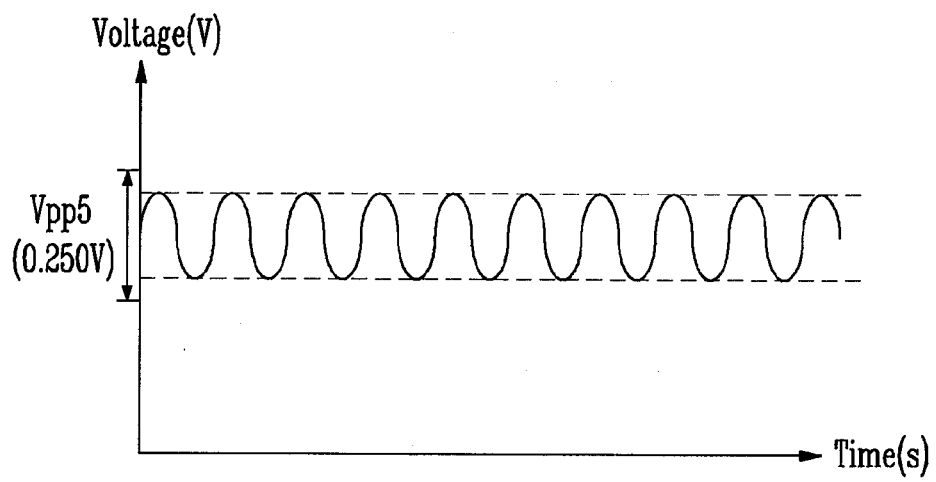
FIG. 5B is a waveform diagram showing a noise signal measured by the touch screen panel shown in FIG. 5A.

Referring to FIG. 1C, the peak-to-peak voltage Vpp1 of the detected noise signal Ns was measured as 0.480V. The peak-to-peak voltage Vpp1 of the detected noise signal Ns is higher than the peak-to-peak voltage Vpp5 (0.250V, see FIG. 5B) of a detected noise signal Ns measured in a comparable touch screen panel 500 of FIG. 5A.

Thus, it can be seen that the reception sensitivity of noise when the electrical connection between the driving electrodes Tx and the driver 10 is cut off is higher than that of noise when the electrical connection between the driving electrodes Tx and the driver 10 is not cut off. This is because the outside noise sensed by the driving electrodes Tx does not come out to the driver 10 by cutting off the electrical connection between the driving electrodes Tx and the driver 10. Therefore, the reception sensitivity of the sensing electrodes Rx is increased.

Referring to FIG. 1B, the controller 20 turns on the first switches S11, S12, S13, and S14 during the touch recognizing mode. Accordingly, the driving signal Ds supplied from the driver 10 is transmitted to the driving electrodes Tx. The controller 20 can then detect a user's touch by analyzing the touch signal Cs detected from the sensing electrodes Rx during the touch recognizing mode.

Figure 2A:
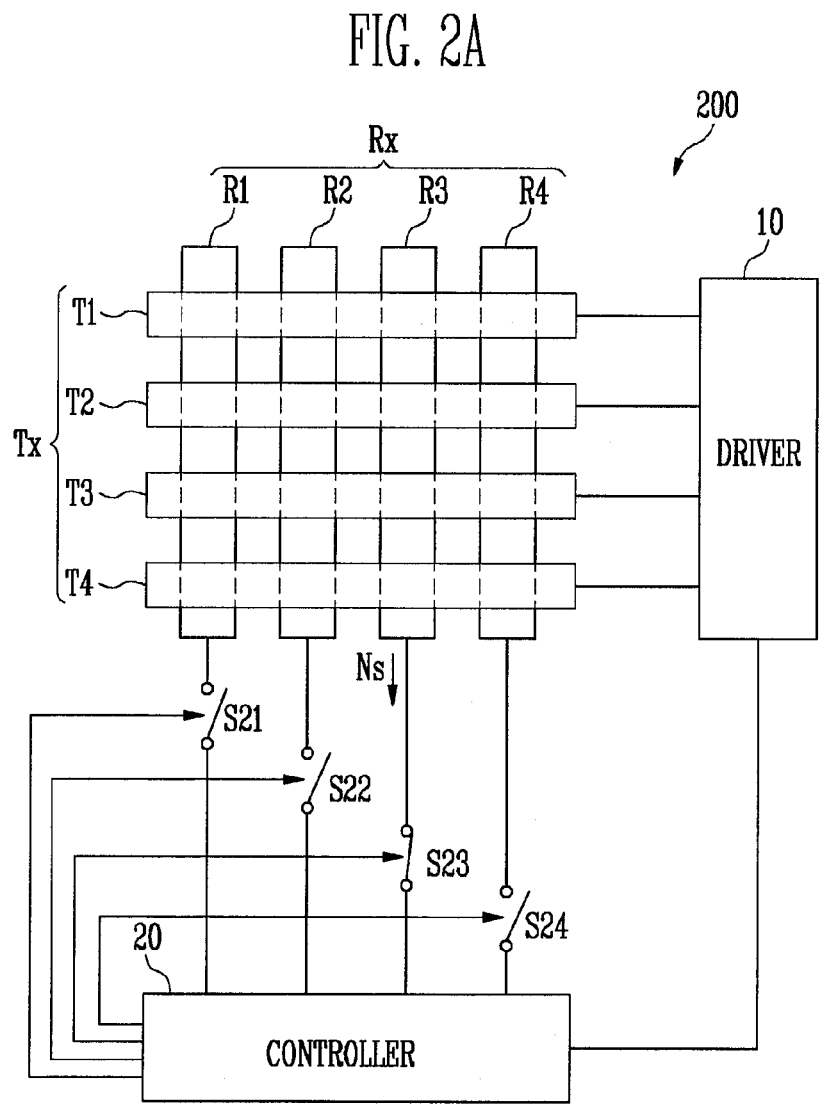
FIGS. 2A and 2B are diagrams showing a touch screen panel according to a second embodiment of the present invention.
Figure 2B:
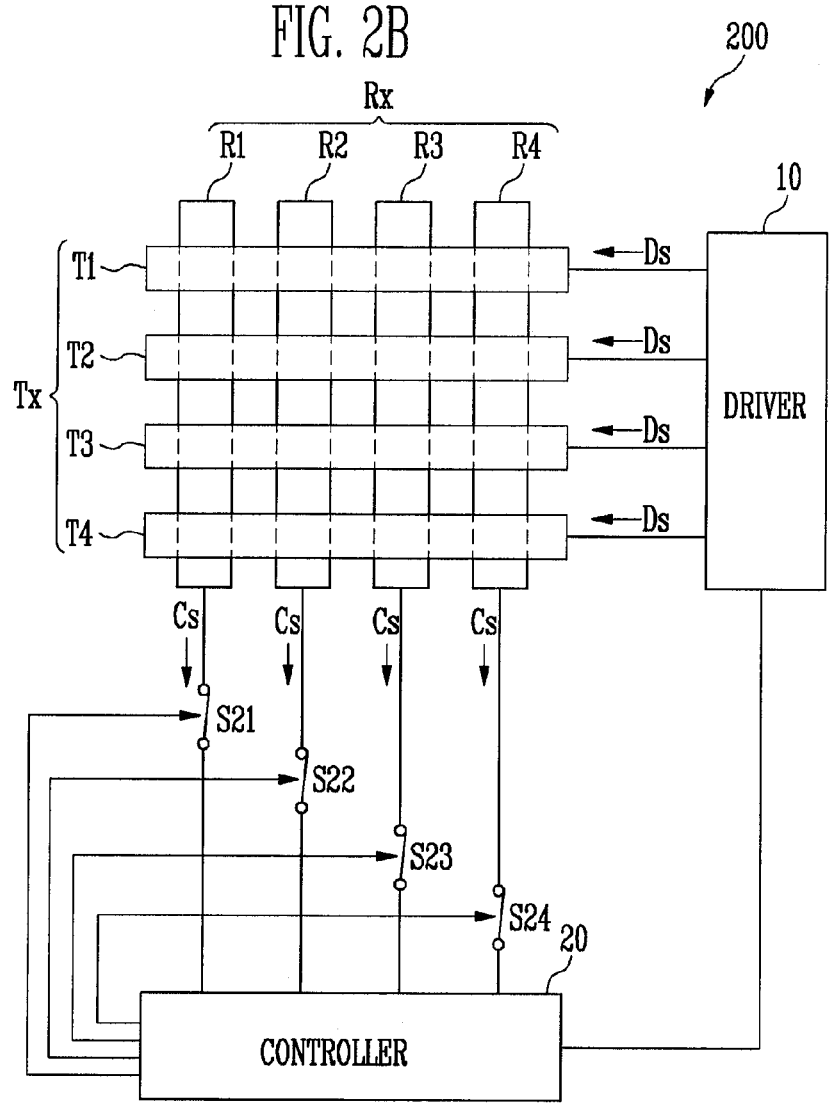

FIGS. 2A and 2B are diagrams showing a touch screen panel 200 according to a second embodiment of the present invention. In particular, FIG. 2A illustrates the touch screen panel 200 in a noise measuring mode, and FIG. 2B illustrates the touch screen panel 200 in a touch recognizing mode.

Referring to FIGS. 2A and 2B, the touch screen panel 200 includes driving electrodes Tx, sensing electrodes Rx, a driver 10, and a controller 20.

The driving electrodes Tx are formed along a first direction (e.g., an X-axis direction). In other embodiments, a plurality of driving electrodes may instead or in addition be arranged along a second direction (e.g., a Y-axis direction) that crosses the first direction. Four driving electrodes T1, T2, T3, and T4 have been illustrated in FIGS. 2A and 2B, but the number of driving electrodes may be different in other embodiments.

The sensing electrodes Rx are arranged to cross the driving electrodes Tx. In the touch screen panel 200, the sensing electrodes Rx are formed along the second direction. In other embodiments, a plurality of sensing electrodes may instead or in addition be arranged along the first direction. Four sensing electrodes R1, R2, R3, and R4 have been illustrated in FIGS. 2A and 2B, but the number of sensing electrodes may be different in other embodiments.

The driving and sensing electrodes Tx and Rx may be formed of a transparent conductive material. For example, the driving and sensing electrodes Tx and Rx may be formed of ITO, IZO, graphene, carbon nanotube, AgNWs, or the like. The driving and sensing electrodes Tx and Rx are formed in a bar shape as shown in FIG. 2A. However, the shape of the driving and sensing electrodes Tx and Rx may be different in other embodiments.

The driving and sensing electrodes Tx and Rx may be disposed on a substrate, such as a predetermined substrate. The substrate may be made of, for example, a material having insulation properties, such as glass, plastic, silicon, or synthetic resin. In addition, the substrate may be formed of metal or the like. The substrate may be implemented as a film having flexibility, which can be bent or folded.

The driving and sensing electrodes Tx and Rx may be disposed in different layers from each other. To this end, an insulation layer may exist between the driving and sensing electrodes Tx and Rx. The insulation layer may partially exist only in a region in which the driving and sensing electrodes Tx and Rx cross each other.

In the touch recognizing mode of FIG. 2B, the driver 10 supplies a driving signal Ds to the driving electrodes Tx. For example, the driver 10 may sequentially supply the driving signal Ds to the driving electrodes Tx. The touch recognizing mode is a mode in which a user's touch input to the touch screen panel 200 is detected.

In the touch screen panel 200, the driver 10 is controlled by the controller 20. For example, the driver 10 may set the frequency of the driving signal Ds to avoid the frequency of a noise signal Ns detected by the controller 20. The controller 20 receives signals (for example, a touch signal Cs and the noise signal Ns) output from the sensing electrodes Rx. Accordingly, the controller 20 can detect a user's touch input in the touch recognizing mode, and can detect outside noise in the noise measuring mode.

The noise measuring mode is a mode in which an outside noise signal (e.g., from an external environment) is detected. For example, the outside noise signal may be detected when there is no user's touch being input to the touch screen panel 200. The noise measuring mode may be performed, for example, when the touch screen panel 200 is initially driven, and may again be performed during the operation of the touch screen panel 200. For example, the noise measuring mode may be periodically performed to rapidly cope with a change in external environment.

In the noise measuring mode of the touch screen panel 200, the controller 20 cuts off the electrical connection between a portion of the sensing electrodes Rx and the controller 20 to improve the reception sensitivity of external noise. To this end, the touch screen panel 200 further includes second switches S21, S22, S23, and S24 positioned between the respective sensing electrodes Rx and the controller 20. The on/off operations of the second switches S21, S22, S23, and S24 are controlled by the controller 20. Thus, the controller 20 turns off a portion of the second switches S21, S22, S23, and S24 to cut off the electrical connection between a corresponding portion of the sensing electrodes Rx and the controller 20.

The controller 20 may detect the noise signal Ns output from the sensing electrodes Rx according to a change in capacitance caused by the outside noise. For example, as shown in FIG. 2A, the controller 20 detects the noise signal Ns output from only one of the sensing electrodes Rx, in this case the third sensing electrode R3, by turning on only one of the second switches, namely, S23. The other second switches S21, S22, and S24 are turned off to increase the reception sensitivity of this noise. Although four second switches S21, S22, S23, and S24 are illustrated in FIGS. 2A and 2B, the number of second switches may be different in other embodiments depending on factors such as the number of sensing electrodes Rx.

Figure 2C:
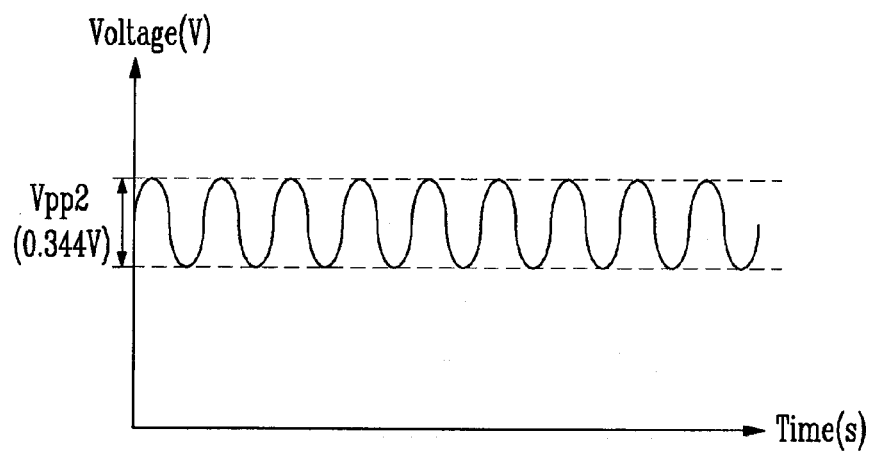
FIG. 2C is a waveform diagram showing a noise signal measured by the touch screen panel shown in FIG. 2A.

FIG. 2C is a waveform diagram showing the noise signal Ns measured by the touch screen panel shown in FIG. 2A. Here, the noise signal Ns is measured when only one of the second switches S21, S22, S23, and S24 is turned on.

Referring to FIG. 2C, the peak-to-peak voltage Vpp2 of the detected noise signal Ns was measured as 0.344V. The peak-to-peak voltage Vpp2 of the detected noise signal Ns is higher than the peak-to-peak voltage Vpp5 (0.250V, see FIG. 5B) of the detected noise signal Ns measured in the comparable touch screen panel 500 of FIG. 5A.

Thus, it can be seen that the reception sensitivity of noise when the electrical connection between a portion of the sensing electrodes Rx and the controller 20 is cut off is higher than that of noise when the electrical connection between the portion of the sensing electrodes Rx and the controller 20 is not cut off. This is because the outside noise sensed by the portion of the sensing electrodes Rx of which electrical connection to the controller 20 is cut off does not come out to the controller 20, but is instead concentrated on the sensing electrodes Rx that maintain the electrical connection to the controller 20.

Referring to FIG. 2B, the controller 20 turns on the second switches S21, S22, S23, and S24 during the touch recognizing mode. The driver 10 transmits the driving signal Ds to the driving electrodes Tx during the touch recognizing mode. Thus, the controller 20 can detect a user's touch input by analyzing the touch signal Cs detected from the sensing electrodes Rx during the touch recognizing mode.

Figure 3A:
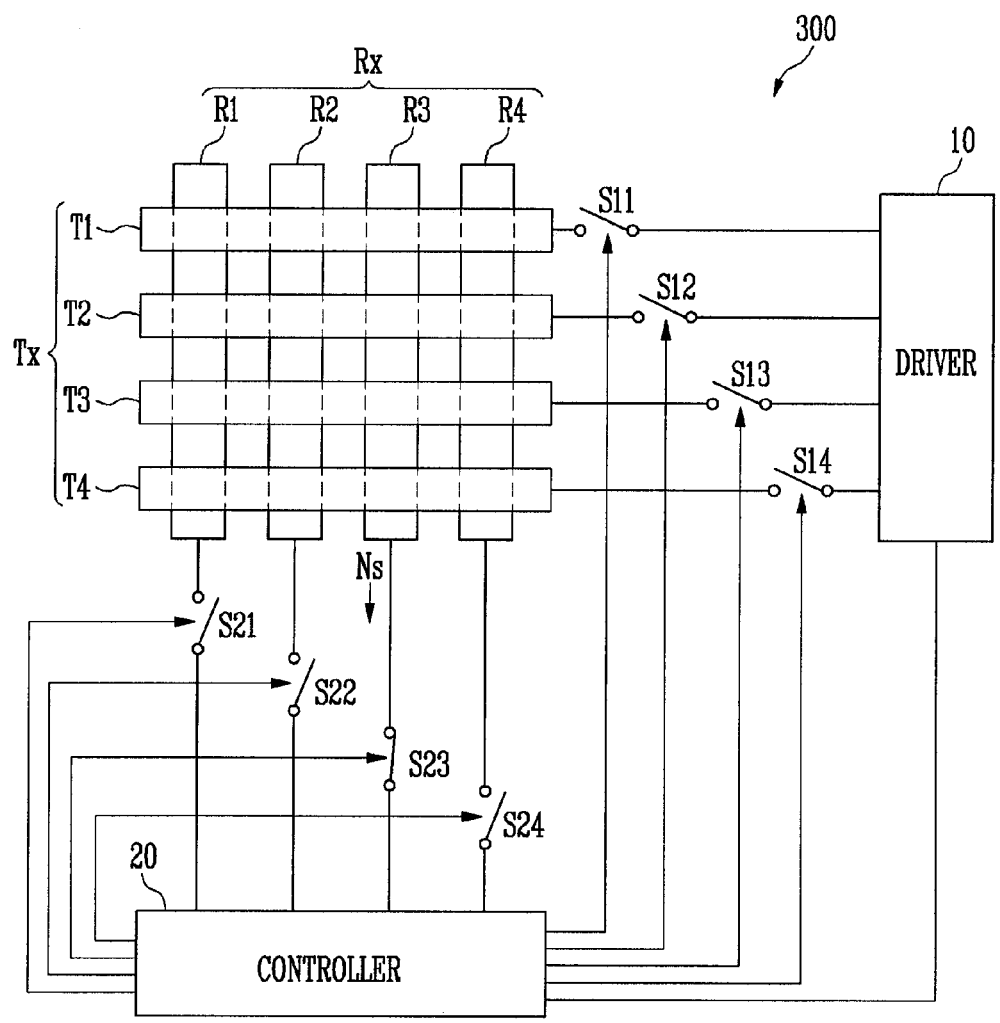
FIGS. 3A and 3B are diagrams showing a touch screen panel according to a third embodiment of the present invention.
Figure 3B:
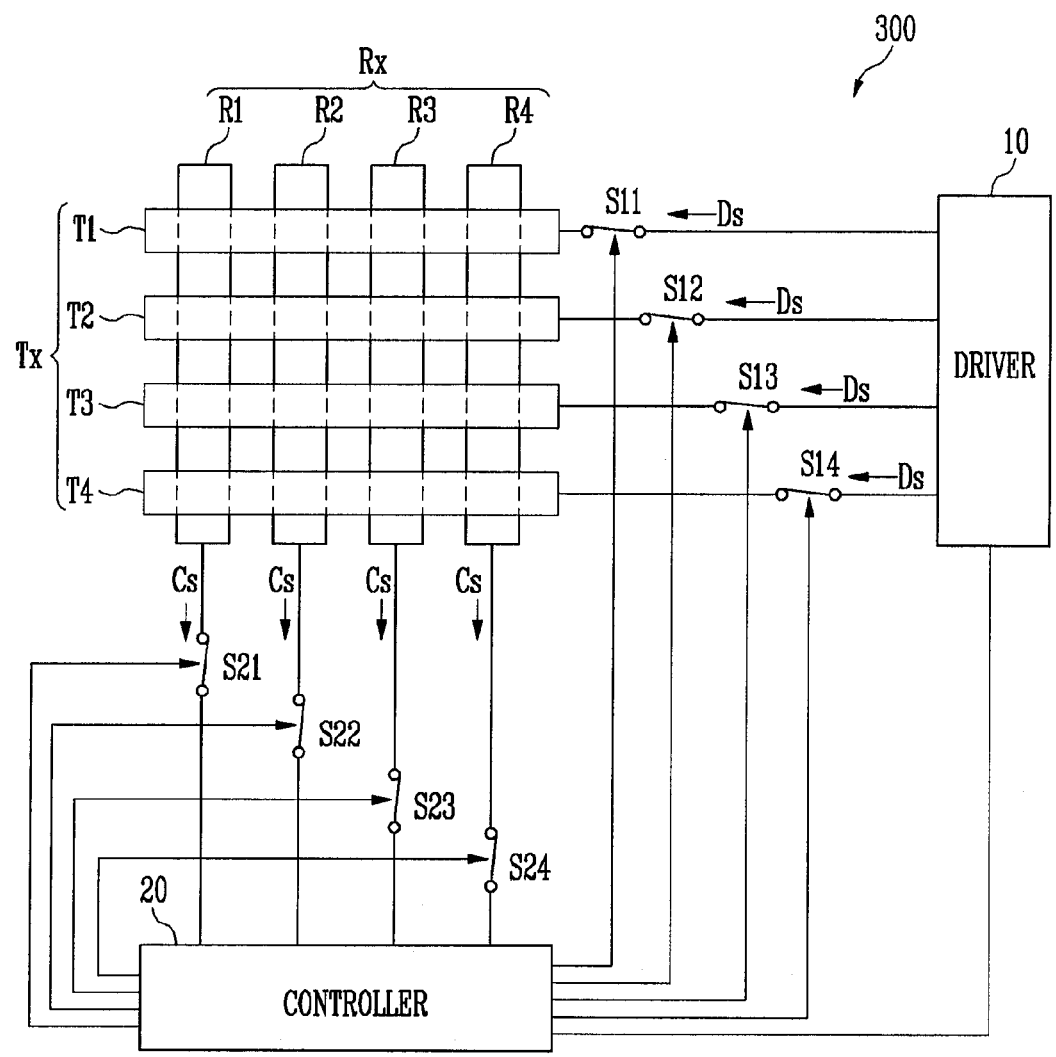

FIGS. 3A and 3B are diagrams showing a touch screen panel 300 according to a third embodiment of the present invention. In particular, FIG. 3A illustrates the touch screen panel 300 in a noise measuring mode, and FIG. 3B illustrates the touch screen panel 300 in a touch recognizing mode.

Referring to FIGS. 3A and 3B, the touch screen panel 300 includes driving electrodes Tx, sensing electrodes Rx, a driver 10, and a controller 20. The driving electrodes Tx are formed along a first direction (e.g., an X-axis direction). In other embodiments, a plurality of driving electrodes may instead or in addition be arranged along a second direction (e.g., a Y-axis direction) that crosses the first direction. Four driving electrodes T1, T2, T3, and T4 have been illustrated in FIGS. 3A and 3B, but the number of driving electrodes may be different in other embodiments.

The sensing electrodes Rx are arranged to cross the driving electrodes Tx. In the touch screen panel 100, the sensing electrodes Rx are formed along the second direction. In other embodiments, a plurality of sensing electrodes may instead or in addition be arranged along the first direction. Four sensing electrodes R1, R2, R3, and R4 have been illustrated in FIGS. 3A and 3B, but the number of sensing electrodes may be different in other embodiments.

The driving and sensing electrodes Tx and Rx may be formed of a transparent conductive material. For example, the driving and sensing electrodes Tx and Rx may be formed of ITO, IZO, graphene, carbon nanotube, AgNWs, or the like. The driving and sensing electrodes Tx and Rx are formed in a bar shape as shown in FIG. 3A. However, the shape of the driving and sensing electrodes Tx and Rx may be different in other embodiments.

The driving and sensing electrodes Tx and Rx may be disposed on a substrate, such as a predetermined substrate. The substrate may be made of, for example, a material having insulation properties, such as glass, plastic, silicon, or synthetic resin. In addition, the substrate may be formed of metal or the like. The substrate may be implemented as a film having flexibility, which can be bent or folded.

The driving and sensing electrodes Tx and Rx may be disposed in different layers from each other. To this end, an insulation layer may exist between the driving and sensing electrodes Tx and Rx. The insulation layer may partially exist only in a region in which the driving and sensing electrodes Tx and Rx cross each other.

In the touch recognizing mode of FIG. 3B, the driver 10 supplies a driving signal Ds to the driving electrodes Tx. For example, the driver 10 may sequentially supply the driving signal Ds to the driving electrodes Tx. The touch recognizing mode is a mode in which a user's touch input to the touch screen panel 300 is detected.

In the touch screen panel 300, the driver 10 is controlled by the controller 20. For example, the driver 10 may set the frequency of the driving signal Ds to avoid the frequency of a noise signal Ns detected by the controller 20. The controller 20 receives signals (for example, a touch signal Cs and the noise signal Ns) output from the sensing electrodes Rx. Accordingly, the controller 20 can detect a user's touch input in the touch recognizing mode, and can detect outside noise in the noise measuring mode.

The noise measuring mode is a mode in which an outside noise signal (e.g., from an external environment) is detected. For example, the outside noise signal may be detected when there is no user's touch being input to the touch screen panel 300. The noise measuring mode may be performed, for example, when the touch screen panel 300 is initially driven, and may again be performed during the operation of the touch screen panel 300. For example, the noise measuring mode may be periodically performed to rapidly cope with a change in external environment.

In the noise measuring mode of the touch screen panel 300, the controller 20 cuts off the electrical connection between at least one driving electrode Tx and the driver 10, and cuts off the electrical connection between a portion of the sensing electrodes Rx and the controller 20 to improve the reception sensitivity of external noise. To this end, the touch screen panel 300 further includes first switches S11, S12, S13, and S14 positioned between the respective driving electrodes Tx and the driver 10, and second switches S21, S22, S23, and S24 positioned between the respective sensing electrodes Rx and the controller 20.

The on/off operations of the first switches S11, S12, S13, and S14 are controlled by the controller 20. Thus, the controller 20 turns off at least one of the first switches S11, S12, S13, and S14 to cut off the electrical connection between a corresponding at least one driving electrode Tx and the driver 10. Although four first switches S11, S12, S13, and S14 are illustrated in FIGS. 3A and 3B, the number of first switches may be different in other embodiments depending on factors such as the number of driving electrodes Tx.

The second switches S21, S22, S23, and S24 are positioned between the respective sensing electrodes Rx and the controller 20. The on/off operations of the second switches S21, S22, S23, and S24 are controlled by the controller 20. Thus, the controller 20 turns off a portion of the second switches S21, S22, S23, and S24 to cut off the electrical connection between a corresponding portion of the sensing electrodes Rx and the controller 20. Although four second switches S21, S22, S23, and S24 are illustrated in FIGS. 3A and 3B, the number of second switches may be different in other embodiments depending on factors such as the number of sensing electrodes Rx.

The controller 20 may detect the noise signal Ns output from the sensing electrodes Rx according to a change in capacitance caused by the outside noise. For example, as shown in FIG. 3A, the controller 20 detects the noise signal Ns output from only one of the sensing electrodes Rx, in this case the third sensing electrode R3. The first switches S11, S12, S13, and S14, and the other second switches S21, S22, and S24 are turned off to increase the reception sensitivity of this noise.

Figure 3C:
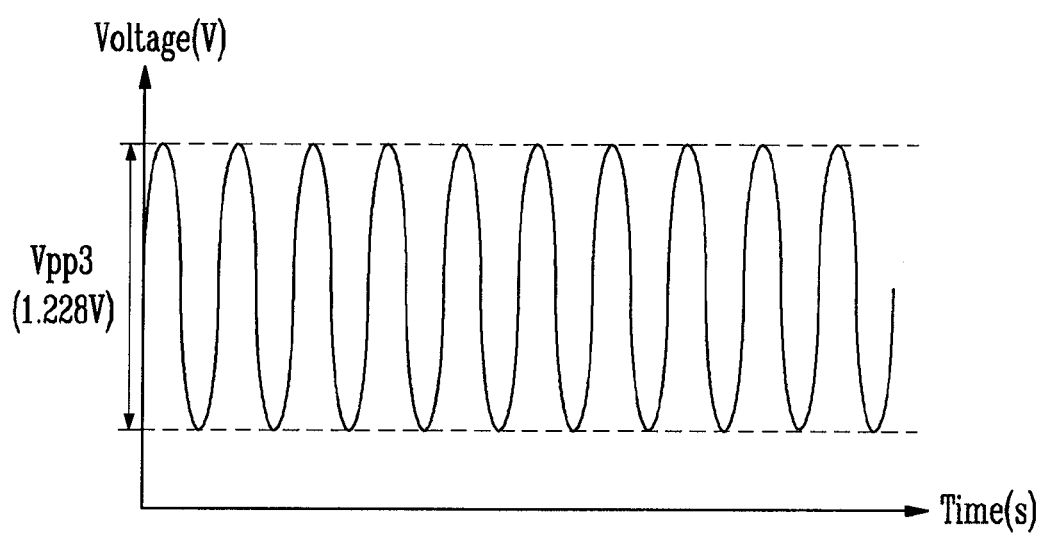
FIG. 3C is a waveform diagram showing a noise signal measured by the touch screen panel shown in FIG. 3A.

FIG. 3C is a waveform diagram showing the noise signal Ns measured by the touch screen panel shown in FIG. 3A. Here, the noise signal Ns is measured when the first switches S11, S12, S13, and S14 are turned off, and only one of the second switches S21, S22, S23, and S24 is turned on.

Referring to FIG. 3C, the peak-to-peak voltage Vpp3 of the detected noise signal Ns was measured as 1.228V. The peak-to-peak voltage Vpp3 of the detected noise signal Ns is significantly higher than the peak-to-peak voltage Vpp5 (0.250V, see FIG. 5B) of the detected noise signal Ns measured in the comparable touch screen panel 500 of FIG. 5A.

Thus, it can be seen that the reception sensitivity of noise when the electrical connection between the driving electrodes Tx and the driver 10 is cut off, and the electrical connection between a portion of the sensing electrodes Rx and the controller 20 is cut off, is significantly higher than that of noise when the electrical connection between the driving electrodes Tx and the driver 10 is not cut off, and the electrical connection between the portion of the sensing electrodes Rx and the controller 20 is not cut off. This is because the outside noise sensed by the driving electrodes Tx does not come out to the driver 10 by cutting off the electrical connection between the driving electrodes Tx and the driver 10. Therefore, the reception sensitivity of the sensing electrodes Rx is increased. In addition, this is because the outside noise sensed by the portion of the sensing electrodes Rx of which electrical connection to the controller 20 is cut off does not come out to the controller 20, but is instead concentrated on the sensing electrodes Rx that maintain the electrical connection to the controller 20.

Referring to FIG. 3B, the controller 20 turns on the first switches S11, S12, S13, and S14, and the second switches S21, S22, S23, and S24 during the touch recognizing mode. The driver 10 transmits the driving signal Ds to the driving electrodes Tx during the touch recognizing mode. Thus, the controller 20 can detect a user's touch input by analyzing the touch signal Cs detected from the sensing electrodes Rx during the touch recognizing mode.

Figure 4A:
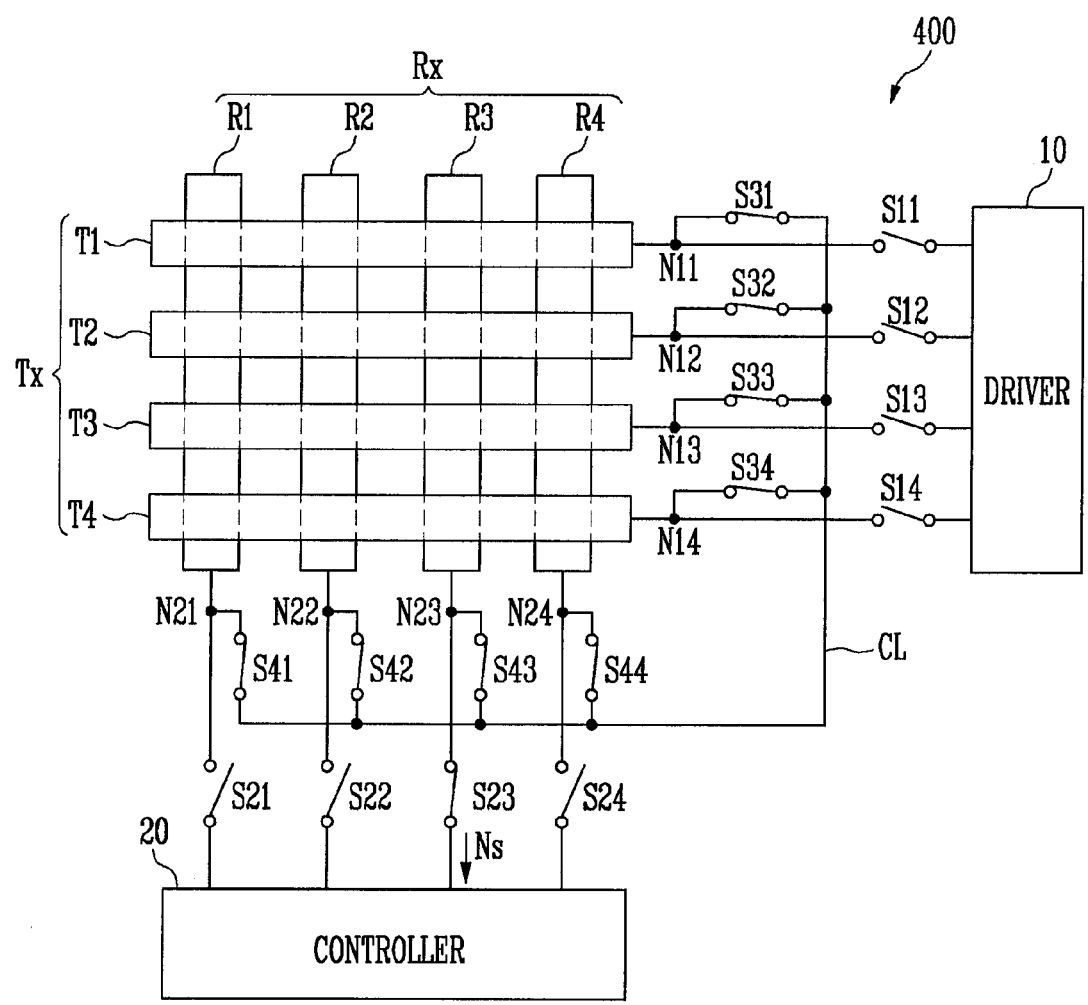
FIGS. 4A and 4B are diagrams showing a touch screen panel according to a fourth embodiment of the present invention.
Figure 4B:
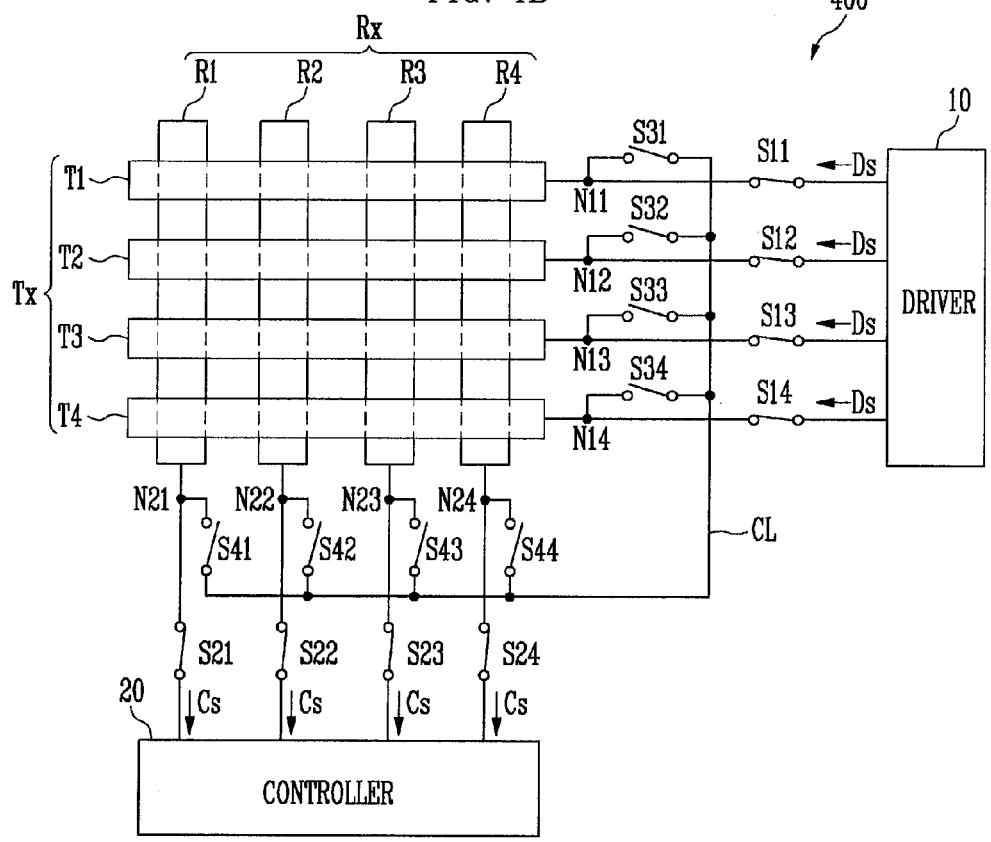

FIGS. 4A and 4B are diagrams showing a touch screen panel 400 according to a fourth embodiment of the present invention. In particular, FIG. 4A illustrates the touch screen panel 400 in a noise measuring mode, and FIG. 4B illustrates the touch screen panel 400 in a touch recognizing mode.

Referring to FIGS. 4A and 4B, the touch screen panel 400 includes driving electrodes Tx, sensing electrodes Rx, a driver 10, and a controller 20. The driving electrodes Tx are formed along a first direction (e.g., an X-axis direction). In other embodiments, a plurality of driving electrodes may instead or in addition be arranged along a second direction (e.g., a Y-axis direction) that crosses the first direction. Four driving electrodes T1, T2, T3, and T4 have been illustrated in FIGS. 4A and 4B, but the number of driving electrodes may be different in other embodiments.

The sensing electrodes Rx are arranged to cross the driving electrodes Tx. In the touch screen panel 400, the sensing electrodes Rx are formed along the second direction. In other embodiments, a plurality of sensing electrodes may instead or in addition be arranged along the first direction. Four sensing electrodes R1, R2, R3, and R4 have been illustrated in FIGS. 4A and 4B, but the number of sensing electrodes may be different in other embodiments.

The driving and sensing electrodes Tx and Rx may be formed of a transparent conductive material. For example, the driving and sensing electrodes Tx and Rx may be formed of ITO, IZO, graphene, carbon nanotube, AgNWs, or the like. The driving and sensing electrodes Tx and Rx are formed in a bar shape as shown in FIG. 4A. However, the shape of the driving and sensing electrodes Tx and Rx may be different in other embodiments.

The driving and sensing electrodes Tx and Rx may be disposed on a substrate, such as a predetermined substrate. The substrate may be made of, for example, a material having insulation properties, such as glass, plastic, silicon, or synthetic resin. In addition, the substrate may be formed of metal or the like. The substrate may be implemented as a film having flexibility, which can be bent or folded.

The driving and sensing electrodes Tx and Rx may be disposed in different layers from each other. To this end, an insulation layer may exist between the driving and sensing electrodes Tx and Rx. The insulation layer may partially exist only in a region in which the driving and sensing electrodes Tx and Rx cross each other.

In the touch recognizing mode of FIG. 4B, the driver supplies a driving signal Ds to the driving electrodes Tx. For example, the driver 10 may sequentially supply the driving signal Ds to the driving electrodes Tx. The touch recognizing mode is a mode in which a user's touch input to the touch screen panel 400 is detected.

In the touch screen panel 400, the driver 10 is controlled by the controller 20. For example, the driver 10 may set the frequency of the driving signal Ds to avoid the frequency of a noise signal Ns detected by the controller 20. The controller 20 receives signals (for example, a touch signal Cs and the noise signal Ns) output from the sensing electrodes Rx. Accordingly, the controller 20 can detect a user's touch input in the touch recognizing mode, and can detect noise input from the outside in the noise measuring mode.

The noise measuring mode is a mode in which an outside noise signal (e.g., from an external environment) is detected. For example, the noise signal may be detected when there is no user's touch being input to the touch screen panel 400. The noise measuring mode may be performed, for example, when the touch screen panel 400 is initially driven, and may again be performed during the operation of the touch screen panel 400. For example, the noise measuring mode may be periodically performed to rapidly cope with a change in external environment.

In the noise measuring mode of the touch screen panel 400, the controller 20 cuts off the electrical connection between at least one driving electrode Tx and the driver 10 to improve the reception sensitivity of external noise. To this end, the touch screen panel 400 further includes first switches S11, S12, S13, and S14 positioned between the respective driving electrodes Tx and the driver 10. The on/off operations of the first switches S11, S12, S13, and S14 are controlled by the controller 20. Thus, the controller 20 turns off at least one of the first switches S11, S12, S13, and S14 to cut off the electrical connection between a corresponding at least one driving electrode Tx and the driver 10.

In addition (or instead), in the noise measuring mode of the touch screen panel 400, the controller 20 cuts off the electrical connection between a portion of the sensing electrodes Rx and the controller 20 to improve the reception sensitivity of external noise. To this end, the touch screen panel 400 further includes second switches S21, S22, S23, and S24 positioned between the respective sensing electrodes Rx and the controller 20. The on/off operations of the second switches S21, S22, S23, and S24 are controlled by the controller 20. Thus, the controller 20 turns off a portion of the second switches S21, S22, S23, and S24 to cut off the electrical connection between a corresponding portion of the sensing electrodes Rx and the controller 20.

Although four first switches S11, S12, S13, and S14 are illustrated in FIGS. 4A and 4B, the number of first switches may be different in other embodiments depending on factors such as the number of driving electrodes Tx. Likewise, although four second switches S21, S22, S23, and S24 are illustrated in FIGS. 4A and 4B, the number of second switches may be different in other embodiments depending on factors such as the number of sensing electrodes Rx.

In the touch screen panel 400, the driving electrodes Tx and the sensing electrodes Rx are electrically connected to each other in the noise measuring mode. To this end, the touch screen panel 400 further includes a common line CL, third switches S31, S32, S33, and S34, and fourth switches S41, S42, S43, and S44. The third switches S31, S32, S33, and S34 are respectively positioned between the common line CL and common nodes N11, N12, N13, and N14, which are respectively positioned between the driving electrodes Tx and the first switches S11, S12, S13, and S14. The fourth switches S41, S42, S43, and S44 are respectively positioned between the common line CL and common nodes N21, N22, N23, and N24, which are respectively positioned between the sensing electrodes Rx and the second switches S21, S22, S23, and S24.

The on/off operations of the third switches S31, S32, S33, and S34, and of the fourth switches S41, S42, S43, and S44 are controlled by the controller 20. Accordingly, when the third switches S31, S32, S33, and S34, and the fourth switches S41, S42, S43, and S44 are turned on, the driving and sensing electrodes Tx and Rx are electrically connected through the common line CL. Thus, the controller 20 turns on the third switches S31, S32, S33, and S34, and the fourth switches S41, S42, S43, and S44 during the noise measuring mode, so that the driving and sensing electrodes Tx and Rx are electrically connected to each other.

The controller 20 may detect the noise signal Ns output from the sensing electrodes Rx according to a change in capacitance caused by the outside noise. For example, as shown in FIG. 4A, the controller 20 detects the noise signal Ns output from only one of the sensing electrodes Rx, in this case the third sensing electrode R3, by turning on only one of the second switches, namely, S23. To increase the reception sensitivity of this noise, the controller 20 turns off the first switches S11, S12, S13, and S14, and the other second switches S21, S22, and S24.

Figure 4C:
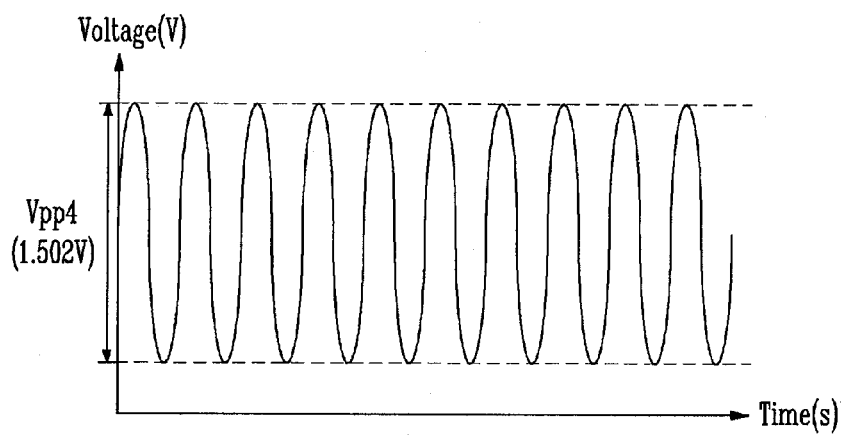
FIG. 4C is a waveform diagram showing a noise signal measured by the touch screen panel shown in FIG. 4A.

FIG. 4C is a waveform diagram showing the noise signal Ns measured by the touch screen panel shown in FIG. 4A. Here, the noise signal Ns is measured when the first switches S11, S12, S13, and S14 are turned off, only one of the second switches S21, S22, S23, and S24 is turned on, and the third switches S31, S32, S33, and S34, and the fourth switches S41, S42, S43, and S44 are turned on.

Referring to FIG. 4C, the peak-to-peak voltage Vpp4 of the detected noise signal Ns was measured as 1.502V. The peak-to-peak voltage Vpp4 of the detected noise signal Ns is significantly higher than the peak-to-peak voltage Vpp5 (0.250V, see FIG. 5B) of the detected noise signal Ns measured in the comparable touch screen panel 500 of FIG. 5A.

Thus, it can be seen that the reception sensitivity of noise when the driving and sensing electrodes Tx and Rx are electrically connected to each other is significantly higher than that of noise when the driving and sensing electrodes Tx and Rx are not electrically connected to each other. This is because the driving and sensing electrodes Tx and Rx are electrically connected to each other, so that they behave as if they were one conductive plate. Accordingly, outside noise sensed by any of the driving and sensing electrodes Tx and Rx can be more easily detected by being concentrated on a specific sensing electrode Rx.

Referring to FIG. 4B, the controller 20 turns on the first switches S11, S12, S13, and S14, and the second switches S21, S22, S23, and S24, and turns off the third switches S31, S32, S33, and S34, and the fourth switches S41, S42, S43, and S44 during the touch recognizing mode. The driver 10 transmits the driving signal Ds to the driving electrodes Tx during the touch recognizing mode. Accordingly, the controller 20 can detect a user's touch input by analyzing the touch signal Cs detected from the sensing electrodes Rx during the touch recognizing mode.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel comprising:
   a plurality of driving electrodes;
   a plurality of sensing electrodes crossing the driving electrodes;
   a driver for supplying a driving signal to the driving electrodes in a touch recognizing mode;
   a controller for receiving signals from the sensing electrodes;
   first switches between respective ones of the driving electrodes and the driver;
   second switches between respective ones of the sensing electrodes and the controller;
   a common line;
   third switches between the common line and respective common nodes between the respective ones of the driving electrodes and the first switches; and
   fourth switches between the common line and respective common nodes between the respective ones of the sensing electrodes and the second switches,
   wherein, in a noise measuring mode, the controller is configured to
      cut off an electrical connection between one of the driving electrodes and the driver or between one of the sensing electrodes and the controller,
      maintain an electrical connection between another one of the sensing electrodes and the controller,
      detect a noise signal from the other one of the sensing electrodes,
      turn on the third and fourth switches,
      turn off the first switches, and
      turn off all but one of the second switches.

2. The touch screen panel according to claim 1, wherein, in the touch recognizing mode, the controller is configured to turn on the first switches.

3. The touch screen panel according to claim 1, wherein, in the touch recognizing mode, the controller is configured to turn on the second switches.

4. The touch screen panel according to claim 1, wherein, in the noise measuring mode, the controller is further configured to
   turn off one of the first switches, and
   turn off one of the second switches.

5. The touch screen panel according to claim 4, wherein, in the touch recognizing mode, the controller is configured to turn on the first and second switches.

6. The touch screen panel according to claim 1, wherein, in the touch recognizing mode, the controller is configured to turn on the first and second switches, and turn off the third and fourth switches.

7. A driving method of a touch screen panel, the method comprising:
   cutting off an electrical connection between one of a plurality of driving electrodes and a driver or between one of a plurality of sensing electrodes and a controller, when the touch screen panel is in a noise measuring mode;
   maintaining an electrical connection between another one of the sensing electrodes and the controller during the noise measuring mode;
   and
   detecting a noise signal output from the other one of the sensing electrodes during the noise measuring mode,
   wherein the touch screen panel comprises:
      first switches between respective ones of the driving electrodes and the driver;
      second switches between respective ones of the sensing electrodes and the controller;
      third switches between a common line and respective common nodes between the respective ones of the driving electrodes and the first switches; and
      fourth switches between the common line and respective common nodes between the respective ones of the sensing electrodes and the second switches,
   wherein the method further comprises turning on the third and fourth switches during the noise measuring mode, and
   wherein the cutting off of the electrical connection further comprises:
      turning off the first switches; and
      turning off all but one of the second switches.

8. The method according to claim 7, wherein the cutting off of the electrical connection comprises:
   turning off one of the first switches; and
   turning off one of the second switches.

9. The method according to claim 8, further comprising turning on the first and second switches when the touch screen panel is in a touch recognizing mode after the noise measuring mode.

10. The method according to claim 9, further comprising supplying a driving signal from the driver to the driving electrodes during the touch recognizing mode.

11. The method according to claim 7, further comprising turning on the first and second switches and turning off the third and fourth switches when the touch screen panel is in a touch recognizing mode after the noise measuring mode.

* * * * *